United States Patent
Manohar

(10) Patent No.: US 12,240,057 B2
(45) Date of Patent: Mar. 4, 2025

(54) METHOD OF LASER CUTTING STEEL

(71) Applicant: ArcelorMittal, Luxembourg (LU)

(72) Inventor: Murali Manohar, Valparaiso, IN (US)

(73) Assignee: ArcelorMittal, Luxembourg (LU)

( * ) Notice: Subject to any disclaimer, the term of this patent is extended or adjusted under 35 U.S.C. 154(b) by 902 days.

(21) Appl. No.: 17/299,553

(22) PCT Filed: Nov. 21, 2019

(86) PCT No.: PCT/IB2019/060016
§ 371 (c)(1),
(2) Date: Jun. 3, 2021

(87) PCT Pub. No.: WO2020/121088
PCT Pub. Date: Jun. 18, 2020

(65) Prior Publication Data
US 2022/0016732 A1    Jan. 20, 2022

(30) Foreign Application Priority Data
Dec. 13, 2018   (WO) .................. PCT/IB2018/059988

(51) Int. Cl.
| | | |
|---|---|---|
| B23K 26/38 | (2014.01) | |
| B23K 26/40 | (2014.01) | |
| B23K 103/04 | (2006.01) | |
| C22C 38/00 | (2006.01) | |
| C22C 38/02 | (2006.01) | |
| C22C 38/04 | (2006.01) | |
| C22C 38/42 | (2006.01) | |

(52) U.S. Cl.
CPC .............. *B23K 26/38* (2013.01); *B23K 26/40* (2013.01); *C22C 38/002* (2013.01); *C22C 38/02* (2013.01); *C22C 38/04* (2013.01); *C22C 38/42* (2013.01); *B23K 2103/04* (2018.08)

(58) Field of Classification Search
CPC ... B23K 26/38–40; C22C 38/02; C22C 38/04; C22C 38/06; C22C 38/28; C22C 38/32
USPC ........................................................ 219/121
See application file for complete search history.

(56) References Cited

FOREIGN PATENT DOCUMENTS

| CN | 1418978 A | 5/2003 |
|---|---|---|
| EP | 1312690 B1 | 8/2006 |
| EP | 2169083 A1 | 3/2010 |
| JP | S56158824 A | 12/1981 |
| JP | H08146097 A | 6/1996 |
| JP | H08157956 A | 6/1996 |
| JP | H08333628 A | 12/1996 |
| JP | H0941040 A | 2/1997 |
| JP | H10176246 A | 6/1998 |
| JP | 2013248629 A | 12/2013 |
| JP | 2018059187 A | 4/2018 |
| WO | WO2012014851 A1 | 2/2012 |

OTHER PUBLICATIONS

Ueda et al., JP 2012087339 A (Year: 2012).*
See Search Report of PCT/IB2019/060016 dated Jan. 29, 2020.
"CO2 laser beam cutting of steels: Material issues", Murali Manohar, Journal of Laser Applications 18, 101 (2006).
Berntsen: "Uncovering Carbide on Carbon Steels by Use of Anodic Galvanostatic Polarization and Its Effect on CO2 Corrosion," Corrosion (2016) 72 (4): 534-546. Dec. 22, 2015.

* cited by examiner

*Primary Examiner* — Vy T Nguyen
(74) *Attorney, Agent, or Firm* — Davidson Kappel LLC

(57) ABSTRACT

A method for laser cutting a steel alloy sheet/plate having a composition including, in wt. %: C: 0.0-0.29; Mn: 0.50-1.35; P: 0.04 max; S: 0.05 max; Si: 0.40 max; Cr: 0.5-0.75, and the remainder being iron and impurities, the steel alloy is free from intentional additions of Cu and Ni and containing less than 0.05% of total cumulated amounts of Cu and Ni.

6 Claims, No Drawings

METHOD OF LASER CUTTING STEEL

FIELD OF THE INVENTION

The present invention relates to a method of laser cutting mild/low alloy steels and more particularly a method of cutting mild/low alloy steels suitable for laser cutting. Specifically, the present intention relates to a method for laser cutting mild/low alloy steels suitable for laser cutting with improved cut quality.

BACKGROUND OF THE INVENTION

Laser cutting, and laser fine cutting are applied for different kinds of materials where complex contours demand precise, fast and force-free processing. Lasers create narrow kerfs (a slit made by cutting) and thus achieve high-precision cuts. This method results in minimal distortion and in many cases post-processing is not necessary as the component is subject to only little heat input and can mostly be cut dross-free.

Almost all kinds of metals can be laser cut: mild steel, stainless steel and aluminum are the most common applications. Other laser cut parts are made from wood, plastics, glass and ceramics. Compared to alternative techniques like die cutting, laser cutting is cost-efficient already for small-batch production. The big benefit of laser cutting is the localized laser energy input providing small focal diameters, small kerf widths, and high feed rate. Basically, the cutting of metals with lasers happens through the local heating of the material above its melting point in the focal point of the focused laser. In the case of carbon and low alloy steels, a jet of oxygen coaxial with the laser beam is used as the assist gas and the exothermic reaction of oxygen with the steel contributes significantly to the cutting action. The resulting molten/oxidized material is ejected by a gas flow oriented coaxially to the laser beam so that a kerf is formed. For low-alloyed (mild) steels in particular, oxygen is typically used as cutting gas.

As stated in "$CO_2$ laser beam cutting of steels: Material issues", Murali Manohar, Journal of Laser Applications 18, 101 (2006), usually a minimum level of residual elements such as Cu, Ni, and Cr are necessary to obtain clean and consistent laser cut quality in thick (20-25 mm) plates. Also, since a minimum level of residual elements is necessary to ensure good laser cuts in both the as-rolled as well as shot-blasted conditions, the suitability of the steel for laser cutting can be quantified by a simple "laser readiness parameter" (LRP), which was defined as LRP=% Cu+% Ni+% Cr. It also states that scale adherence and scale density increase with increasing LRP, with the latter leveling off at an LRP value around 0.45%-0.5%. Manohar found that a Cu—Ni-rich layer is present at the scale-steel interface, and the degree of enrichment increases with increasing Cu and Ni. Manohar seems to indicate that acceptable laser ready steels must have significant amounts of Cu and Ni and that Cr may be less important. That is, Manohar determined that: "Steels bearing Cu and Ni were found to cut better than those without these elements. However, contrary to results with as-rolled and shot-blasted mill plates, Cr was found to degrade cut quality in lab plates even when Cu and Ni were present." This suggests that the role played by Cu and Ni during cutting may be different from that by Cr. Manohar goes on to propose a cutting mechanism that only depends on Cu and Ni and less on Cr.

While briefly discussing the laser cutting quality of a 32 mm thick plate of mild steel which is free of Ni and Cu, (containing 0.84 Cr), Manohar suggests that lower cost mild steels could be made using between 0.3-0.35 Cr and just enough Ni and Cu to bring the LRP up to 0.45. No data on such a steel is presented.

There is a need in the art for a method of laser cutting laser ready mild/low alloy steels with improved cut quality.

SUMMARY OF THE INVENTION

The instant invention is a method of laser cutting an improved laser cuttable steel. The method includes the steps of: providing a steel cutting laser and providing a laser cuttable steel alloy sheet/plate. The steel alloy sheet/plate has a composition comprising, in wt. %: C: 0.01-0.29; Mn: 0.50-1.35; P: 0.04 max; S: 0.05 max; Si: 0.40 max; Cr: 0.5-0.75, the remainder being iron and impurities, said steel alloy being free from intentional additions of Cu and Ni and containing less than 0.05% of total cumulated amounts of Cu and Ni. The method includes the further step of directing a laser beam from said steel cutting laser to the laser cuttable steel alloy sheet/plate and cutting said laser cuttable steel alloy sheet/plate with said laser beam.

The inventive method cuts steels that have a broad compositional range of C: 0.01-0.29; Mn: 0.50-1.35; P: 0.04 max; S: 0.05 max; Si: 0.40 max, (preferred for thicker plates Si: 0.15-0.40); Cr: 0.5-0.75; and the remainder being iron and impurities. Further the inventive method includes alloys that are free from intentional additions of Cu and Ni. That is, the alloy may contain residual levels of Cu and Ni only, nothing higher. In the method of the invention, the maximum cumulated amount of Cu and Ni is such that (in wt %): Cu+Ni 0.05%. In a preferred embodiment of the method, the maximum cumulated total amount of Cu and Ni is below 0.02%.

Preferably the alloys of the present inventive method have a composition in wt. % of: C: 0.10-0.25; Mn: 0.8-1.2; Si: max 0.15; and Cr: 0.55-0.75. Most preferably the alloys of the present inventive method have a composition in wt. % of: C: 0.12-0.23; Mn: 0.8-1.05; Si: 0.02-0.14; and Cr: 0.55-0.72.

DETAILED DESCRIPTION OF THE INVENTION

One type of mild steel that is often cut by laser is the ASTM A36 type steel for structural applications. The compositional specifications for A36 mild steel plates is, in wt.%: C: 0.29 max; Mn: 0.80-1.20; P: 0.04 max; S: 0.05 max; Si: 0.40 max, (preferred for thicker plates 0.15-0.40). The steel must have a minimum Yield Strength of 250 MPa.

Another type of steel that can be cut by lasers is the ASTM A572 type steel. The compositional specifications for A572 is, in wt. %: C: 0.26 max; Mn: 0.50-1.35; P: 0.04 max; S: 0.05 max; Si: 0.40 max, (preferred for thicker plates 0.15-0.40). The steel must have a minimum Yield Strength of 290 MPa.

The instant invention is a method for laser cutting an improved laser cuttable version of such A36 and A572 steels. The inventive method includes providing a steel cutting laser and providing steel sheet or plate have a broad compositional range of C: 0.01-0.29; Mn: 0.50-1.35; P: 0.04 max; S: 0.05 max; Si: 0.40 max, (preferred for thicker plates Si: 0.15-0.40); Cr: 0.5-0.75; and the remainder being iron and impurities. The method also includes the step of directing a laser beam from the steel cutting to the laser cuttable steel alloy sheet/plate and cutting the laser cuttable steel alloy sheet/plate with the laser beam.

Further the inventive method may provide alloys are free from intentional additions of Cu and Ni. That is, the alloy may contain residual levels of Cu and Ni only, nothing higher. In the inventive method, the steel includes a maximum cumulated amount of Cu and Ni such that (in wt %): Cu+Ni 0.05%. In a preferred embodiment, the maximum cumulated amount of Cu and Ni is below 0.02%.

Preferably the alloys of the present inventive method have a composition in wt. % of: C: 0.10-0.25; Mn: 0.8-1.2; Si: max 0.15; and Cr: 0.55-0.75. Most preferably the alloys of the present inventive method have a composition in wt. % of: C: 0.12-0.23; Mn: 0.8-1.05; Si: 0.02-0.14; and Cr: 0.55-0.72.

Examples of laser cuttable steels useful for the present method are presented in Table 1. The compositions are given in wt. %. Cu and Ni are only present in residual amounts.

TABLE 1

| Heat No | C | Mn | P | S | Si | Cr | Ni | Cu |
|---|---|---|---|---|---|---|---|---|
| 1 | 0.23 | 1 | 0.02 | 0.01 | 0.03 | 0.59 | 0.01 | 0.01 |
| 2 | 0.19 | 0.84 | 0.02 | 0.01 | 0.02 | 0.56 | 0.02 | 0.02 |
| 3 | 0.22 | 1.02 | 0.01 | 0.01 | 0.02 | 0.57 | 0.01 | 0.01 |
| 4 | 0.2 | 0.86 | 0.01 | 0.01 | 0.02 | 0.55 | 0.01 | 0.01 |
| 5 | 0.12 | 0.95 | 0.007 | 0.005 | 0.138 | 0.72 | 0.02 | 0.03 |

Table 2 discloses the composition, in wt. %, of three prior art (commercially available) laser cutting steel comparative samples. As can be seen, the prior art steels have amounts of Cu and Ni added intentionally and significantly lower contents of Cr than the inventive steels.

TABLE 2

| Sample | C | Mn | Si | P | S | Ni | Mo | Cr | Cu |
|---|---|---|---|---|---|---|---|---|---|
| C1 | 0.15 | 0.95 | 0.131 | 0.011 | 0.006 | 0.21 | 0.006 | 0.09 | 0.244 |
| C2 | 0.155 | 0.788 | 0.051 | 0.008 | 0.005 | 0.136 | 0.036 | 0.048 | 0.275 |
| C3 | 0.155 | 1.166 | 0.028 | 0.028 | 0.004 | 0.127 | 0.037 | 0.107 | 0.275 |

Plates of the alloys useful in the inventive method and comparative examples (25.5 mm and 19 mm) were tested for their laser cutting performance. The cutting performance was tested in both the as-hot-rolled condition and the hot-rolled/shot-blasted condition. Hot rolled coils within the compositional range up to 25 mm thick were also tested in the as-rolled, shot blasted and pickled & oiled condition. Laser cut trials indicate that the laser cut quality of inventive steel plates and coils is better than the comparative prior art laser ready steel plates.

What is claimed is:

1. A method for laser cutting a steel alloy sheet/plate, the method comprising the steps of:
providing a steel cutting laser;
providing a laser cuttable steel alloy sheet/plate, the steel alloy sheet/plate having a composition consists, in wt. %, of: C: 0.10-0.25; Mn: 0.8-1.2; P: 0.04 max; S: 0.05 max; Si: 0.15 max; Cr: 0.55-0.75, and a remainder being iron and impurities, the steel alloy being free from intentional additions of Cu and Ni and containing less than 0.05% of total cumulated amounts of Cu and Ni;
directing a laser beam from the steel cutting laser to the laser cuttable steel alloy sheet/plate; and
cutting said laser cuttable steel alloy sheet/plate with the laser beam.

2. The method as recited in claim 1 wherein the steel comprises C: 0.12-0.23.

3. The method as recited in claim 2 wherein the steel comprises Mn: 0.8-1.05.

4. The method as recited in claim 3 wherein the steel comprises Si: 0.02-0.14.

5. The method as recited in claim 4 wherein the steel comprises Cr: 0.55-0.72.

6. The method of claim 1, wherein the steel alloy sheet/plate has a yield strength of at least 250 MPa.

* * * * *